United States Patent
Bitterolf et al.

(10) Patent No.: US 12,208,436 B2
(45) Date of Patent: Jan. 28, 2025

(54) MOTION PLANNING FOR A CONVEYOR SYSTEM OF A SERVO PRESS INSTALLATION

(71) Applicant: Siemens Aktiengesellschaft, Munich (DE)

(72) Inventors: David Bitterolf, Erlangen (DE); Stephan Hoja, Cadolzbrug (DE); Dominik Kneissl, Nuremberg (DE); Oleg Schlegel, Erlangen (DE); Tina Stöckel, Bubenreuth (DE)

(73) Assignee: Siemens Aktiengesellschaft, Munich (DE)

(*) Notice: Subject to any disclaimer, the term of this patent is extended or adjusted under 35 U.S.C. 154(b) by 976 days.

(21) Appl. No.: 16/573,386

(22) Filed: Sep. 17, 2019

(65) Prior Publication Data
US 2020/0086375 A1   Mar. 19, 2020

(30) Foreign Application Priority Data
Sep. 18, 2018   (EP) .................... 18195208

(51) Int. Cl.
*B21D 43/12*   (2006.01)
*B21C 31/00*   (2006.01)
*B65G 65/00*   (2006.01)

(52) U.S. Cl.
CPC ............. *B21D 43/12* (2013.01); *B21C 31/00* (2013.01); *B65G 65/005* (2013.01)

(58) Field of Classification Search
CPC ........ B21D 43/02; B21D 43/04; B21D 43/05; B21D 43/10; B21D 43/12; B21D 43/11; G05B 2219/45142; B65G 47/905; B65G 65/005; B21C 31/00
See application file for complete search history.

(56) References Cited

U.S. PATENT DOCUMENTS

| | | | |
|---|---|---|---|
| 7,428,837 B2 * | 9/2008 | Takayama | G05B 19/41815 100/207 |
| 7,636,612 B2 * | 12/2009 | Weber | G05B 19/4069 717/124 |
| 8,423,159 B2 * | 4/2013 | Bosga | B30B 15/146 901/6 |
| 8,855,817 B2 * | 10/2014 | Casanelles | B25J 9/1682 901/29 |
| 9,020,630 B2 * | 4/2015 | Kaneko | B30B 15/148 700/206 |
| 9,144,903 B2 * | 9/2015 | Kaneko | B25J 9/1664 |

(Continued)

FOREIGN PATENT DOCUMENTS

| | | |
|---|---|---|
| CN | 201576207 U | 9/2010 |
| CN | 106773716 | 5/2017 |
| GB | 902985 | 8/1962 |

OTHER PUBLICATIONS

JP 59-212135A, Nonaka Dec. 1984.*

(Continued)

*Primary Examiner* — Edward T Tolan
(74) *Attorney, Agent, or Firm* — Cozen O'Connor (57) ABSTRACT

A method for motion planning for a conveyor system of a servo press installation, a motion controller for a conveyor system of a servo press installation, and to an associated computer program product, wherein an angular offset is optimized with respect to power peaks.

14 Claims, 2 Drawing Sheets

(56) References Cited

U.S. PATENT DOCUMENTS

| | | | | |
|---|---|---|---|---|
| 9,864,822 | B2* | 1/2018 | Schaer | G06F 30/20 |
| 11,112,776 | B2* | 9/2021 | Keselman | B25J 11/005 |
| 11,173,680 | B2* | 11/2021 | Hoja | B30B 15/26 |
| 2006/0179906 | A1* | 8/2006 | McCallum | B21D 43/05 |
| | | | | 72/31.1 |
| 2006/0217841 | A1 | 9/2006 | Matsumoto et al. | |
| 2006/0230809 | A1* | 10/2006 | Luthi | B21D 43/055 |
| | | | | 72/405.13 |
| 2009/0177306 | A1* | 7/2009 | Bosga | B30B 15/148 |
| | | | | 901/6 |
| 2013/0119916 | A1 | 5/2013 | Wang et al. | |
| 2018/0117869 | A1 | 5/2018 | Hoja et al. | |
| 2019/0118241 | A1* | 4/2019 | Moser | B21D 43/05 |

OTHER PUBLICATIONS

JP 2006-130560A, Kurihara et al. May 2006.*
DE 102010060158A, Schoellhammer Apr. 2012.*
KR 20100122630A, Kim et al. Nov. 2010.*
Office Action dated Dec. 15, 2020 issued in Chinese Patent Application No. 201910883510.0.

* cited by examiner

MOTION PLANNING FOR A CONVEYOR SYSTEM OF A SERVO PRESS INSTALLATION

BACKGROUND OF THE INVENTION

1. Field of the Invention

The invention relates to motion planning for a conveyor system of a servo press installation, a motion controller for a conveyor system of a servo press installation, and to an associated computer program product.

2. Description of the Related Art

In the forming industry, presses are employed for the forming or pressing of material. In many cases, entire press lines are employed, in which a plurality of presses are arranged one after another, and a workpiece or product that is to be processed is moved from one press to the next, or to subsequent presses. For example, a metal part to be pressed is firstly pressed into a first shape by a first press, and is then transferred to a second press as a second processing station, where the metal part is subject to further processing. These presses are partially independent and, for process engineering purposes, they are connected by systems for the conveyance of material. Reference is made to a conveyor system, such as a transfer system, which is responsible for conveyance between the presses, or an appropriate robot. An apparatus that executes the conveyance of material between the presses is also described as a conveyor apparatus or a transfer apparatus, or as a transfer system.

The presses are mutually electrically synchronized via a synchronous gearing or cam disk system, optionally with an angular offset, where the material conveyor systems are respectively electrically synchronized with an individual press via a synchronous gearing or cam disk system, or via control tappets.

Servo presses are increasingly employed in the forming industry. In servo presses, a substantial proportion of the forming power is generated directly by the primary press drive, and not substantially by a mechanical flywheel, as in the case of flywheel presses. This results in a correspondingly high peak power during the forming in the case of servo presses. A servo press can deliver the tappet or the eccentric cam in accordance with a motion profile, where, in particular, delivery proceeds slowly during the forming process and rapidly at the turning point, in the interests of increasing productivity. A servo press is operated at a lower forming speed in comparison with the average speed.

Conventionally, angle-based programming of the conveyor device is executed based on the associated press, in either a synchronized or an event-driven arrangement. Programming incorporates a description of the conveyor motion with respect to the angle of motion of the press, i.e., a motion of the conveyor system for the removal of a product from a first press commences upon a predefined press opening of the press. This motion is executed as a complete positioning set, and incorporates the penetration of the conveyor apparatus into the press for the pick-up of the product, a forward motion to a next press, the subsequent deposition of the product in the next press and the return to a waiting position, from which the transfer is restarted, and the cycle commences once more. A predefined press closure of the next press constitutes a further precondition for the transfer motion. At this time point, the conveyor apparatus must have resumed a specified status in relation to the press, for example, outside the press.

For the description of the conveyor motion, only data with respect to permissible dynamics, such as maximum possible speeds or maximum possible acceleration, together with the start and end points of the motion segment and the type of motion profile, for example a polynomial, are specified.

Depending upon the programming of the conveyor system, the time required for the handling of material in the press is concluded. The slower the capability of the conveyor system to execute the transfer of material, the more time required for the loading and unloading on a press. Correspondingly, the press must provide more time for this process, which can result in a slower pressing speed. The mutual offset of the presses is also dependent upon the time required by the conveyor device for the conveyance process.

The offset between two presses is advantageously adjustable. In order to increase this offset, the transfer system must be correspondingly bridled in its forward motion, i.e., the overall time required by the transfer system for the conveyance of material from a first press to a second press is to be extended. As the overall forward motion of the conveyor system from the preceding press to the subsequent press is conventionally comprised of a single positioning set, any reduction in the dynamics of this positioning set is simultaneously associated with an increase in the time required for the handling of material, i.e., the loading and unloading thereof in the press. In consequence, the press must provide more time for this process which, in turn, may lead to bridling of the press. This is disadvantageous, because this is precisely the phase in which the press might be operated at higher than average speed.

SUMMARY OF THE INVENTION

In view of the foregoing, it is an object of the invention to provide an improved operation of a servo press installation, where it is necessary to reduce a maximum achievable machine speed to the least possible extent.

This and other objects and advantages are achieved in accordance with the invention by a method for motion planning for a conveyor system of a servo press installation, where, at least a first servo press and a second servo press are provided in the servo press installation, and where the conveyor system comprises at least one conveyor apparatus for the movement of a product that is to be processed by the servo press installation, and the motion of the at least one conveyor apparatus is controlled by a motion controller of the conveyor system, incorporating the steps including determining a motion segment, outside respective pressing workspaces of the first servo press and the second servo press; defining and specifying a time interval for motion within the motion segment, and motion for from the first servo press to the second servo press; and calculating a motion curve for motion within the motion segment, with reference to the defined and specified time interval.

In accordance with the invention, motion planning for a conveyor system is provided, which comprises the calculation of a motion curve for the motion of a conveyor apparatus. More specifically, the motion curve is calculated for the region in which a delay to the conveyor apparatus ideally has no impact upon the overall time required for the conveyance of material in the press. This overall time for the conveyance of material can thus advantageously be restricted to a minimum. The motion segment lies outside the respective pressing workspaces. This means that, for motion that is executed neither within the pressing workspace of a first servo press, nor within the pressing workspace of a second servo press, but is executed outside the pressing workspaces, a special motion profile is provided, which is tailored to a specific time interval, i.e., which calculates a position characteristic of the conveyor apparatus, for example, of a transfer, during said time interval.

In one possible embodiment, the pressing workspace is described by the geometric pressing workspace. In a particularly simple case, the geometric pressing workspace is defined, for example, by the geometry of the respective press bed. Outside a pressing workspace of the first servo press thus defined, a product that is to be moved to the second press advantageously collides with neither the first servo press, nor with any other product with which the first press is to be loaded, subsequently to unloading.

In a further embodiment, the pressing workspace is defined with reference to a collision region of the product to be unloaded. Accordingly, that region is defined as the pressing workspace in which any geometric or spatial intersection of a product to be loaded and the product to be unloaded is not possible, on the grounds of the geometry of the respective conveyor apparatus and of the respective products. The region outside the pressing workspace thus defined can correspondingly be employed for the forward motion from the first servo press to the second servo press, such that an adjustment of the motion curve does not influence the loaded conveyor apparatus.

In a further embodiment, the pressing workspace is determined in consideration of the respective driving curves of the product to be unloaded and the product to be loaded. For example, a rotation of the products can be mutually tailored such that, notwithstanding any potential geometric overlap of the products, according to their rotational position, no mutual influence of the two products occurs. In this potential determination of the pressing workspace, the region outside the respective pressing workspace is further extended, because the motion profile can still be adjusted to a relatively advanced extent in the press and, in accordance with the steps described, can be determined in relation to the time interval, where the driving profile of the conveyor apparatus between the first and the second servo press and the driving profile of the conveyor apparatus which is to load the first servo press are considered correspondingly.

Thus, in an explicit manner, the element of motion during the conveyance process of the conveyor apparatus can be planned which does not involve loading or unloading, or which has no temporal influence upon these processes, and in particular does not prolong a time interval from the entry of a conveyor apparatus for the unloading on the first servo press to the exit of a further conveyor apparatus for the loading on the first servo press. It can be specified after the expiry of which time interval conveyance outside the pressing workspace from the first servo press to the second servo press is to be completed. To this end, an appropriate offset between two presses is defined. The offset is determined by tests, or is calculated by optimization methods. At the same time, the motion of the transfer system for unloading and/or loading can be executed with maximum speed.

For example, within the motion segment determined, the speed can be reduced, or a controlled reverse motion can be executed, in order to complete conveyance within a predefined and specified time interval. Upon the expiry of the specified time interval, the transfer system and the material are positioned, for example, ahead of the entry into the second servo press, such that the loading of the second servo press, for example, can commence with maximum speed.

In an advantageous manner, the option is thus provided to deliberately bridle the conveyor apparatus within a geometrical region to be specified between two servo presses, without influencing the loading and unloading processes in the servo presses and, more specifically, with no delay in an overall loading and unloading process.

In a servo press installation, in particular, a plurality of servo presses are provided and, for example, a plurality of conveyor apparatuses, which respectively execute conveyance between two servo presses. In one embodiment, the plurality of conveyor apparatuses constitute the conveyor system, and the motion of the individual conveyor apparatuses, which is to be executed individually in each case, in accordance with the respectively determined motion curve, is controlled by a motion controller. For example, the motion controller is a superordinate controller, and subordinate controllers, particularly controllers integrated in a converter, are assigned to the individual conveyor apparatuses.

In accordance with one embodiment, the motion segment is determined with reference to geometric data for the respective servo press and the conveyor apparatus, and, in particular additionally, for the product. In order to determine an appropriate motion segment that only involves the region of the conveyance process which, according to one of the definitions presented does not lie within a pressing workspace, both the servo press itself and the tool, with its specific geometric dimensions, and the conveyor apparatus, with its specific geometric dimensions, are to be taken into consideration.

Depending upon the selection made from the embodiments described for the determination of the pressing workspace, in addition to the geometry of the product to be conveyed and optionally, additionally, the geometry of the conveyor apparatus, the geometrical limitations associated with the servo press or, additionally, with a product to be loaded by the first servo press, or the driving curve thereof, will also need to be taken into consideration. For example, the dimensions of the product conveyed by the conveyor apparatus can have a further restrictive impact upon the motion segment, particularly where the product exceeds the geometrical dimensions of the conveyor apparatus, or extends beyond the latter. The opposite case is also conceivable, in which the conveyor apparatus extends beyond the product. In both cases, it must be ensured that the conveyor apparatus, including the product to be conveyed, is located outside the pressing workspace.

It is thus ensured, in an advantageous manner, that the conveyor device or the conveyor apparatus for the unloading on the first servo press, by interaction with a conveyor apparatus for the loading on said first servo press, can execute the loading and unloading process at maximum speed, without being influenced by motion planning within the motion segment. This ensures that the servo press can be operated at its maximum performance capability. However, as soon as the conveyor apparatus, or the product to be processed by the servo press and conveyed by the conveyor apparatus, lie outside the pressing workspace of a respective servo press, motion can be executed in accordance with the motion planning determined by the disclosed embodiments of the inventive method.

In accordance to one embodiment, the time interval is defined by reference to data relating to an optimum offset between the first servo press and the second servo press. In an advantageous manner, the time interval for motion within the motion segment is stipulated such that an "optimum offset" is determined. This offset relates to the temporal difference in analogous press movements between two servo presses. An offset is understood, for example, as the temporal difference between the upper dead point in a forming cycle of the first servo press and that of the second servo press. For example, an offset is further described as the angular offset in a virtual angle between two servo presses.

In accordance with another embodiment, a minimum time interval is selected for the throughput of the product through the servo press installation as a first criterion for the optimum offset between two servo presses. In many cases, the limiting factor is the speed or dynamics with which the transfer system can execute the conveyance of a workpiece from one servo press to the next. Depending upon how rapidly the conveyor system can execute the conveyance of the products to be processed through the servo press installation, the optimum offset for a servo press pair is determined.

A throughput time-optimized offset thus determined is the smallest possible offset that is possible in order to achieve the maximum performance of the overall system. A smaller offset would reduce the overall performance.

In accordance with another embodiment, as a second criterion for the optimum offset, a minimum overall peak power of the servo press installation is selected. For example, this provides a power-optimized offset which, in comparison with the throughput time-optimized offset, is greater. By the enlargement of the offset, on the basis of a throughput time-optimized offset, it can be achieved, for example, that braking and acceleration processes coincide, and are thus mutually compensated to the maximum possible extent. Power peaks in a plurality of servo presses are reduced accordingly. For example, the optimum offset between two presses would be 180°, or 120° between three presses, etc. Ideally, energy management associated with the reduced peak power can be restricted accordingly, without reducing the overall performance of a servo press installation. This is particularly the case if an offset delay associated with optimization with respect to the power balance can be compensated by a reduction of the waiting time in the home position of the conveyor apparatus. In this case, the system speed, and thus the performance, are not affected.

With energy management, energy for the forming process is also provided. Correspondingly, the interval between forming processes should be sufficient such that a required reloading is still possible. In a case in which the delay time for the implementation of the offset, calculated based on peak power optimization, is greater than a waiting time, optimization is executed with respect to power peaks, at the cost of overall performance.

Although a shorter offset would be specifiable, and the transfer system would be able to fulfill this requirement, as it could execute the conveyance of material with sufficient speed, for example, a longer or greater offset is deliberately established, in order to prevent the temporal coincidence of power peaks in the servo presses of the combined system.

In accordance with another embodiment, as marginal conditions for the motion curve, a first position on a first margin of the motion segment at a starting time point of the time interval, and a second position on a second margin of the motion segment at an end time point of the time interval, are established. Adaptation of the motion curve to motion within the pressing workspaces is ensured accordingly.

In essence, the proposed method for motion planning relates to motion within the motion segment determined. At the same time, however, marginal conditions are considered, which are dictated by motion within the respective pressing workspaces, and thus outside the motion segment. These marginal conditions specifically concern the position at the transition from the respective pressing workspace to the motion segment.

In accordance with a further embodiment, a speed of the conveyor apparatus at the starting time point, and a speed of the conveyor apparatus at the end time point of the time interval are further considered as marginal conditions. Any inconsistencies in speed at the transition between the region outside and within the motion segment are accordingly prevented. As a further marginal condition, acceleration is specifiable as a marginal condition, as is, advantageously, jolting. In this manner, a particularly uniform motion is achieved.

In accordance with another embodiment, the motion curve describes a translational motion. In particular, the conveyor apparatus can execute one-dimensional motion along a rail.

In yet another embodiment, the motion curve describes a continuous motion. In particular, continuity is maintained over the entire cycle of motion within the motion segment. In particular, inconsistencies, which might result in a jolting motion, are prevented. Such start-stop processes, where motion proceeds from full speed to a complete standstill, constitute an unfavorable and non-optimum pattern with respect to energy. However, a departure from provision of continuous motion is possible, where a reversing motion is dictated by an optimum offset determined and marginal conditions determined. A controlled reversing motion, which can also encompass reverse travel of the transfer system in the course of the forward motion, and can be achieved via controlled braking and accelerating with specifiable acceleration, can thus be a constituent of an advantageous motion curve, as an alternative to a fully continuous motion curve.

In yet a further embodiment, the motion curve can be described via polynomials, partially defined functions, point tables or non-linear scaled curve segments. For example, the trajectory of the transfer system within the motion segment is scaled via a C2-constant function, such that a continuous motion profile is executed over the full extent of motion, which directly provides the stipulated time interval for motion within the motion segment.

In accordance with another embodiment, the motion curve describes a constant-acceleration transition between the motion of the conveyor apparatus within the pressing workspace of the first servo press and within the motion segment, and a constant-acceleration transition between the motion of the conveyor apparatus within the motion segment and within the pressing workspace of the second servo press.

It is also an object of the invention to provide a motion controller for a conveyor system of a servo press installation, where the servo press installation comprises at least a first servo press and a second servo press, and where the conveyor system comprises at least one conveyor apparatus for the movement of a product which is to be processed by the servo press installation, comprising a processor and memory, a storage unit for storing data on a motion segment outside respective pressing workspaces of the first servo press and the second servo press; a delivery unit for delivery of an instruction with respect to a time interval for motion within the motion segment, and fuel motion from the first servo press to the second servo press; a calculation unit for calculating a motion curve for motion within the motion segment, with reference to the defined time interval.

In an advantageous manner, a conventional industrial motion controller can be employed, in which a CPU is correspondingly established to incorporate the described calculation unit. Further advantageously, interfaces can be provided which, for example, permit the entry of data to be stored with respect to the motion segment, or the issue of an instruction with respect to the time interval. To this end, for example, a user interface with an input panel can be provided.

The units can be implemented via hardware- and/or software-based configuration. In a hardware-based implementation, the respective unit can be configured as an apparatus, or as part of an apparatus, for example as a computer, or as a processor, or as a microprocessor. In a software-based implementation, the respective unit can be configured as a computer program product, as a function, as a routine, as part of a program code or as an executable object. A processor is to be understood as an electronic circuit for computer-based data processing, such as a CPU. This may be the CPU of a computer, or a microprocessor of a microchip.

In accordance with one embodiment, the motion controller simultaneously controls a motion of at least the first and/or the second servo press. The motion controller can thus be provided as a common motion controller for the servo presses and the conveyor apparatuses. Alternatives are also conceivable, in which the controllers for the servo presses and one or more motion controllers for the conveyor apparatuses are executed separately.

It is also an object of the invention to provide a non-transitory computer readable medium, i.e., a computer program product, having a computer program that comprises means for the execution of the method in accordance with the above-discussed embodiments of the invention, where the computer program is run on a program-controlled device for the execution thereof.

A computer program product, such as a computer program means, can be provided or supplied, for example, as a storage medium, such as a memory card, USB stick, CD-ROM or DVD, or in the form of a downloadable file from a server in a network. This operation can be executed, for example, on a wireless communications network by the transmission of a corresponding file containing the computer program product or the computer program means. With a program-controlled device, a control device, such as a processor or a microprocessor, is in particular considered.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is described in greater detail hereinafter with respect to exemplary embodiments and with reference to the figures, in which.

DETAILED DESCRIPTION OF THE EXEMPLARY EMBODIMENTS

In the figures, functionally identical elements are identified by the same reference symbols, unless indicated otherwise.

Figure 1:
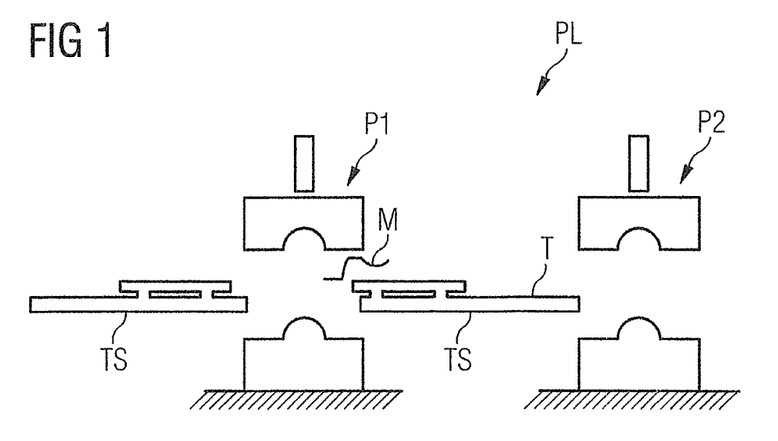
FIG. 1 shows a schematic representation of a conveyor system within a press line, for the illustration of a method for motion planning in accordance with a first exemplary embodiment of the invention.

FIG. 1 shows a sketch of a servo press installation or press line or pressing line PL, in which a first servo press P1 and a second servo press P2 are located. In the interests of clarity, further servo presses have been omitted from this representation. Realistically, more than two servo presses are present in a conventional servo press installation. Moreover, a conveyor system TS is outlined, which incorporates a transfer apparatus T, also described as a transfer system. A transfer apparatus T of this type is configured with a geometry that is adapted to a servo press and incorporates, for example, a moveable part, which is arranged within the transfer apparatus T, and which is appropriate for the accommodation of a product M which is to be processed, such as a workpiece that is to be pressed. For example, a gripper, a gripper arm, a clamp or a sucker of the transfer apparatus T grips the product or the workpiece M, for the conveyance thereof from the first servo press P1 to the second servo press P2. Here, the workpiece, likewise via the transfer system T, is introduced into the pressing workspace of the second servo press P2, and in particular is deposited there or positioned in a mold. Spatially, at least parts of the transfer apparatus T are thus temporarily located within the respective pressing workspace, for the extraction of the workpiece M, for example, of the material to be pressed, from the open first press P1 and the subsequent transfer thereof to the open second press P2.

In a first exemplary embodiment of the invention, it is intended that the overall time required for the passage of a processing product M through a plurality of servo presses, particularly the first servo press P1 and the second servo press P2, and further subsequent servo presses that are not represented, should be minimized. This means that the overall press line PL should deliver a finished processing product M at the maximum possible cycle rate. Processing of a workpiece M is completed, as soon as the workpiece has been transferred from the first processing station, for example the first servo press P1 within the press installation PL, to the final processing station, such as a final servo press, and has been processed to a finished state in all the stations.

For a design of the overall servo press installation PL of this type, in addition to the optimization of the individual forming processes on the individual servo presses, or additionally to the temporal optimization thereof, optimization of the motion of the conveyor system TS is also required. The maximum speed at which a processing product M can be conveyed from one servo press to the next servo press, for example, from the first servo press P1 to the second servo press P2, dictates the minimum offset that should be provided between these two servo presses, for the optimization of the throughput time.

In a particularly simple illustrative scenario, all the forming processes of all the servo presses involved occupy the same length of time, and the offset is zero, such that the complete conveyance process can be executed within a single press cycle. This is possible if the transfer system T is sufficiently rapid to complete the execution of the transfer of the workpiece from the first servo press to the second, and the return thereof to the first press, within a single press cycle. In many cases, however, the execution of such a rapid transfer is not possible.

If an offset greater than zero is set between the first servo press and the second servo press, then the overall time available to the transfer system remains identical. However, the ratio of the conveyance time to the return time changes, i.e., the conveyance time required for the conveyance of the product from the first servo press P1 to the second servo press P2 is greater, whereas the return time for this purpose is shorter. This permits the optimization of the throughput time, even in the event of longer conveyance times of the transfer system T.

It is assumed that, on the grounds of optimization with respect to the overall power required within the press installation PL, an offset between a first servo press 1 and a second servo press 2 will need to be enlarged. The time available to the transfer system T for material handling, in order to position the processing product M in the second servo press P2, should continue to be maintained so as to be as short as possible. At the same time, however, on the grounds of the greater offset to the second servo press P2, the transfer system T should be able to make an adjustment to motion planning.

The adjustment to motion planning is executed such that a motion segment between the first servo press P1 and the second servo press P2 is determined, during which the transfer system does not interact with the preceding transfer system or the subsequent transfer system, such that the time required for the complete loading and unloading process is not affected. This space is also dictated by geometrical factors of the servo press installation PL and the conveyor system TS. Additionally, this space is further limited by the quality of the product M to be processed, because only at the point in time at which the product to be unloaded can no longer delay the subsequent loading process that the overall time required for loading and unloading will not be extended.

It is thus ensured that a delay is only implemented if, for example, there is no resulting delay to the closure of a press, in particular as a result of a delay in a further conveyor system, which is also moved within the first pressing workspace, for the loading of the first servo press.

The segment of motion in the first servo press P1 is completed accordingly, can be executed exceptionally rapidly and, in this case, particularly remains unchanged. At the same time, the motion segment is completed, which the transfer system T is intended to execute exceptionally rapidly. Thereafter, the motion segment of the motion of the transfer system T commences, in which manipulation can be executed with no resulting disadvantage to the cycle rate of the servo presses, if the transfer system T can be driven at a correspondingly higher speed on the return path from the second servo press P2 to the first servo press P1, such that the delay can be recovered.

The overall performance of the press installation is thus maintained. The time required by the transfer system T for the motion from the first servo press P1 to the second servo press P2 is also described as the conveyance time, while that required for the return motion to the first servo press P1 is described as the return time. In particular, the conveyance time can also include the respective handling phase in the press, whether in whole or in part.

In an analogous manner, the motion segment of the second servo press P2 is delimited, because it terminates as soon as a delay in the transfer system, or in the workpiece to be processed, interacts with the subsequent transfer system for the unloading of the second servo press, such that there is a resulting extension of the overall time required for the loading and unloading process on the second servo press. For example, the motion segment of the second servo press can be constituted by the start of the pressing workspace of the second press, or by the point at which the workpieces, in consideration of their trajectory, cannot intersect at any time or, subject to trajectory, further into the interior of the press, provided that any collision on the grounds of the motion curve, and particularly in consideration of a rotation of the components, can be excluded. Here again, the subsequent motion described by the material handling system in the second servo press P2, in an advantageous manner, can continue to be executed at maximum speed. A temporal delay, of the type associated with the further offset between the first servo press P1 and the second servo press P2, only occurs, in an advantageous manner, within the motion segment determined.

The time interval is defined, in an exemplary manner, as follows: a minimum offset is initially determined with reference to a specific programming of the servo presses and the conveyor system. This minimum offset is defined by throughput time optimization. Additionally, an optimized offset is calculated with reference to energy management factors. The deviation of the optimized offset from a minimum offset is calculated therefrom, for example, as a correction angle. An extended conveyance time can be deduced therefrom and, from the latter, finally, the time interval for motion within the motion segment can be deduced.

Without affecting the times required by the transfer system T for the handling of material, the motion curve is thus adapted to the desired offset. In particular, motion curves are selected that ensure a jolt-free motion. C2-constant functions, for example, are suitable for this purpose, and are taken as the basis for a motion curve. With reference to marginal conditions, which are dictated by the motion profile of the transfer system during the unloading and loading on the first servo press or the second servo press, the appropriate motion curve can then be determined.

A second embodiment of the invention is described with reference to FIG. 2. A forward motion of the transfer system T, i.e., the motion of a product M that is to be processed within the servo press installation PL, is adjusted via a motion curve such that, in a quasi-deliberate manner, an offset is generated between the first servo press P1 and the second servo press P2. This offset effects an optimization of energy supply management, where an overall peak power of the servo press installation PL is reduced.

For example, between a plurality of servo presses within the servo press installation PL, and in particular between the first servo press P1 and the second servo press P2, the offset in the forming process motion can be set such that the overall performance of the servo press installation PL is no longer at a maximum, but instead the peak powers thereof, as associated with simultaneous or synchronously executed forming processes on a plurality of servo processes, are significantly reduced.

For example, this case occurs where the installation incorporates transfer systems between presses that have no facility for the compensation of a longer conveyance time by a shorter return time or waiting time within the return motion.

Configurations are also conceivable in which individual transfer systems and the offset with respect to associated presses in the installation are also optimized in consideration of the overall peak power, namely where, via the transfer systems, notwithstanding an extension of the conveyance time, no reduction in performance occurs, and individual transfer systems and the offset thereof with respect to the associated presses are only optimized with respect to the throughput time.

An analysis of the overall servo press installation PL, in which an optimum offset is determined, can advantageously precede motion planning. As soon as an offset between two servo presses is established, the method for motion planning for the conveyor system can be initiated. In the preceding determination of an optimum offset, an enlargement of an individual offset between two servo presses is generally undertaken, commencing from a minimum possible offset dictated by the capabilities of presses and transfer apparatuses.

Figure 2:
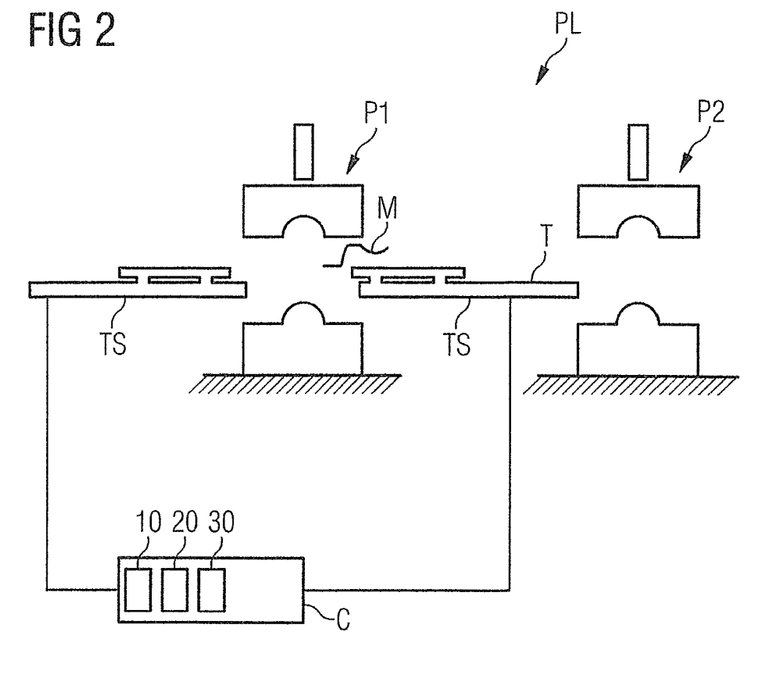
FIG. 2 shows a schematic representation of a conveyor system, with an associated controller, within a servo press installation, for the illustration of a method for motion planning in accordance with a second exemplary embodiment of the invention.

FIG. 2 shows a schematic representation of a motion controller C for a conveyor system TS. In accordance with the second exemplary embodiment of the invention, the motion controller C is configured as a separate motion controller for the conveyor system TS, in addition to a further controller for the servo presses P1 and P2, which is not illustrated. The motion segment, which defines the region outside respective pressing workspaces, for each transfer apparatus T within a servo press installation PL, i.e., between the respective servo presses, can be individual or different in each case. In this regard, firstly, the geometry of the two servo presses involved, and secondly the geometry of the transfer apparatus, play a significant role. For example, the dimensions of the transfer apparatus T itself, for example, the length of the transfer apparatus T, or the dimensions, for example, in consideration of a gripper element, which are provided on the transfer apparatus T, are each different.

Additionally, even in the event of an identical geometry of the presses and transfer apparatuses involved, the motion segment, outside respective pressing workspaces, can vary within the press installation PL, because the product M to be processed by a sequential forming process within the servo press installation PL has differing dimensions. For example, a workpiece, further to a forming process, occupies more space on the transfer apparatus T, and the motion segment that describes the region outside respective pressing workspaces, or the region within which the motion of the transfer apparatus T executes a motion of the totality formed by the transfer apparatus T and the product M to be processed outside respective pressing workspaces, is correspondingly smaller.

For each transfer apparatus, the motion controller C of a conveyor system TS that comprises a plurality of transfer apparatuses holds the corresponding data for the associated motion segment. For example, data are stored in a storage unit 10. Advantageously, in the routine operation of a servo press installation PL, these data do not vary, or vary only slightly. The motion segment is to be determined separately for each transfer system T and, correspondingly, an associated data set for each transfer system T is to be stored in the storage unit 10. Retrieval can be executed, for example, upon the entry into service of the servo press installation PL.

The instruction regarding a time interval for motion within the motion segment is determined with reference to the issue of the offset. On the motion controller 10, for example, a delivery unit 20 is provided, which holds the instruction for the time interval. For example, an offset is communicated to the delivery unit 20 or the motion controller 10 via an input mask, with reference to which the delivery unit 20, in consideration of the times required for material handling, determines the time interval.

Finally, a calculation unit 30 is responsible for the calculation of an appropriate motion curve for motion within the motion segment. To this end, in particular, the interval is considered which, in the second exemplary embodiment of the invention, results in a desired enlarged offset for the minimization of power peaks. Moreover, the marginal conditions to be met, as in particular dictated by the material handling motion, are taken into consideration.

Figure 3:
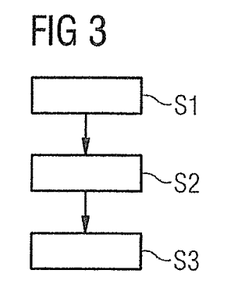
FIG. 3 shows a schematic representation of a process sequence of a method for motion planning for a conveyor system of a servo press installation in accordance with a third exemplary embodiment of the invention.

FIG. 3 shows a schematic illustration of a process sequence, which describes the method for motion planning for a conveyor system in accordance with a third exemplary embodiment of the invention. A first step S1 involves the determination of an appropriate motion segment, outside respective pressing workspaces of the first servo press and the second servo press. A second step S2 involves the definition of a time interval for motion within the motion segment, and from the first servo press to the second servo press.

The first step S1 and the second step S2 can be executed in any preferred sequence. For example, the determination S1 of a motion segment is executed only once whereas, conversely, the definition of a time interval S2 is executed regularly, or at specific intervals. Alternatively, both steps S1 and S2 can be executed with equal frequency.

The first step S1 of determining a motion segment can incorporate sub-steps, which comprise a measurement, particularly a survey of geometrical factors. Moreover, this determination can be executed purely on the basis of calculation using available geometric data or trajectory data. The definition of the time interval, as the second step S2, can incorporate a sub-step, which comprises a manual determination of an appropriate offset, for example, with reference to in-service tests conducted on the servo press installation. Moreover, the calculation of an optimum offset can be executed with reference to an algorithm, such that the definition of a time interval incorporates the processing of the result of such a calculation step.

The method described for motion planning for a conveyor system of a servo press installation is generally preceded by an optimization method, which determines the control of the servo presses at maximum speed of the conveyor system. For example, the operation of the servo press installation is optimized such that the highest possible performance is achieved where, in particular, the transfer apparatuses are operated as rapidly as possible such that, in particular, the loading and unloading processes occupy the least amount of time possible.

Figure 4A:
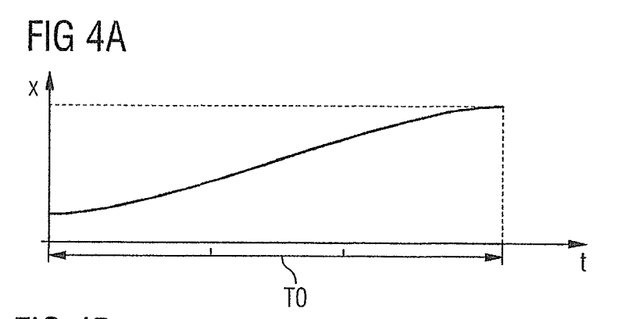
FIGS. 4a-4c show the adjustment of a transfer motion curve to an exact angular offset, based on a conventional transfer motion curve.

In an optimization of this type, for example, a motion curve for the transfer system is plotted, as represented in FIG. 4a. The time t is plotted on the horizontal axis, while the position x of the transfer system is plotted on the vertical axis. A time interval T0 for the transfer motion is thereby selected so as to be as short as possible.

On the basis of this optimization, in which, for example, only a uniform positioning set for a transfer apparatus can be assumed, the method for motion planning for a conveyor system is executed in an advantageous manner in accordance with the third exemplary embodiment of the invention, particularly in consideration of a specified and established time interval for motion within the motion segment, outside the respective pressing workspaces from a first servo press to a second servo press.

Figure 4B:
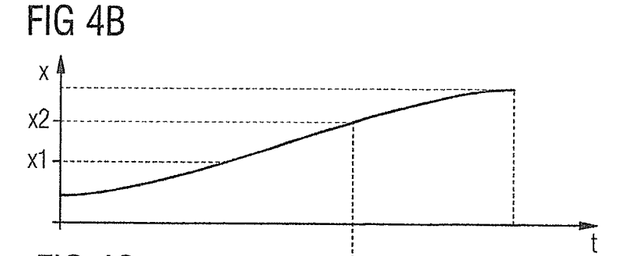

FIG. 4b illustrates this step where, for the motion of the transfer system, positions are determined that delimit or define the motion segment. To this end, for example, a first position x1 is determined, in which the workpiece is located immediately outside the first servo press or leaves the first pressing workspace. Moreover, a second position is determined, for example, in which the workpiece is not yet located in the second servo press, or is on the point of entering the second pressing workspace.

Figure 4C:
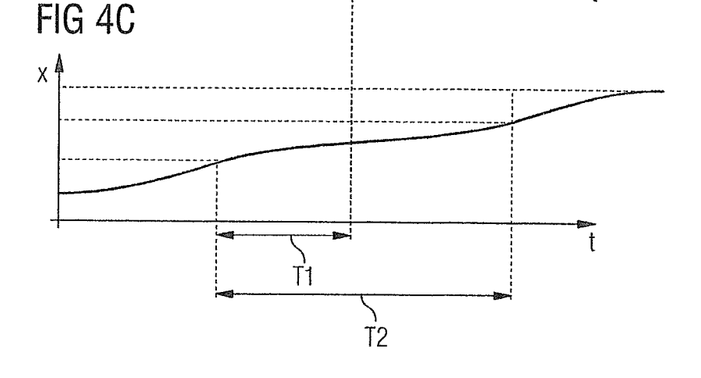

Accordingly, as illustrated in FIG. 4c, the motion curve is then adjusted to an optimally determined angular offset, where the motion curve is adjusted within the first position x1 and the second position x2. In this segment, motion is delayed, and assumes a second time interval T2 in place of a first time interval T1 that was previously required for the motion segment. The motion curve, for example, is adjusted to a curve with a constant speed and acceleration between the motion segments of the respective unloading and loading motion. As can be seen in FIG. 4c, the motion curve within the respective pressing workspaces remains unaffected, and is thus not subject to any delay.

Advantageously, in the application of the proposed method, an offset or angular offset between servo presses within a servo press installation is optimized in a targeted manner, without reducing a maximum achievable machine speed. To this end, in particular, the loading and unloading process on a servo press remains unaffected, and is executed with the maximum dynamics. Any offset that is additionally set via optimization can be compensated by a reduction in the waiting time in the return motion, or by the more rapid execution of the return motion. A deliberate delay outside the geometric pressing workspace particularly permits a conveyance of processing products between servo presses of a servo press installation that is optimized with respect to the energy management of the press.

In particular, by the determination of an optimum offset between two servo presses, power peaks in the presses are evened out, such that power peaks that are dictated per se by the motion profiles of the servo presses, such as braking or acceleration, or by the forming power, are not disadvantageously accumulated. Energy supply systems for the servo press installation can be optimized accordingly. For example, the input power or the size of the energy management system of the machine can be reduced to the greatest possible extent.

In sum, the disclosed embodiments of the invention relate to motion planning for a conveyor system of a servo press installation, a motion controller for a conveyor system of a servo press installation, and to an associated computer program product, in consideration of an angular offset that is optimized with respect to power peaks.

Although the invention has been illustrated and described in greater detail by means of exemplary embodiments, the invention is not limited by the examples disclosed, and further variations and combinations can be inferred by a person skilled in the art, without departing from the scope of protection of the invention.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for controlling a motion of a conveyor system of a servo press installation including at least a first servo press and a second servo press which are operated at an optimum offset in accordance with a criterion, the conveyor system comprising at least one conveyor apparatus for movement of a product which is to be processed by the servo press installation, and motion of the at least one conveyor apparatus being controlled by a motion controller of the conveyor system in accordance with the optimum offset, the method comprising:
   determining a motion curve of the conveyor system including a first margin when the conveyor system is within a workspace of the first servo press, a second margin when the conveyor system is within a workspace of the second servo press, and a segment between the first and second margins which is entirely outside respective pressing workspaces of the at least one first servo press and the second servo press;
   defining a time interval for motion within said segment based on the criterion;
   adjusting the motion curve for motion of the product within the segment such that the motion curve in the first and second margins is unchanged, with reference to the defined time interval; and
   controlling the conveyor system in accordance with the adjusted motion curve.

2. The method as claimed in claim 1, wherein the segment through which the product moves is determined with reference to geometric data for the respective servo press and the conveyor apparatus.

3. The method as claimed in claim 2, wherein the segment through which the product moves is additionally determined for the product.

4. The method as claimed in claim 3, wherein the criterion is a minimum time interval for throughput of the product through the servo press installation.

5. The method as claimed in claim 3, wherein the criterion is a minimum overall peak power of the servo press installation.

6. The method as claimed in claim 4, wherein the criterion further comprises a minimum overall peak power of the servo press installation.

7. The method as claimed in claim 1, wherein a first position on the first margin of the motion curve is a starting time point of the time interval and a second position on the second margin of the motion curve is an end time point of the time interval.

8. The method as claimed in claim 1, wherein the motion curve describes a translational motion.

9. The method as claimed in claim 1, wherein the motion curve describes a continuous motion.

10. The method as claimed in claim 1, wherein the motion curve is described via one of (i) polynomials, (ii) partially defined functions, (iii) point tables and (iv) non-linear scaled curve segments.

11. The method as claimed in claim 1, wherein the motion curve describes a constant-acceleration transition between the motion of the conveyor apparatus between the first margin and the segment, and describes a constant-acceleration transition between the motion of the conveyor apparatus between the segment and the second margin.

12. A motion controller for controlling a motion of a conveyor system of a servo press installation comprising at least a first servo press and a second servo press which are operated at an optimum offset in accordance with a criterion, the conveyor system comprising at least one conveyor apparatus for movement of a product which is to be processed by the servo press installation, the motion controller comprising:
- a storage unit for storing data on a motion curve of the conveyor system including a first margin when the conveyor system is within a workspace of the first servo press, a second margin when the conveyor system is within a workspace of the second servo press, and a segment between the first and second margins which is entirely outside respective pressing workspaces of the at least one first servo press and the second servo press;
- a delivery unit for delivering an instruction with respect to a time interval for motion within the segment based on the criterion; and
- a calculation unit for calculating an adjusted motion curve for motion of the product within the segment such that the motion curve in the first and second margins is unchanged, with reference to the defined time interval;
- wherein the motion controller controls the conveyor system in accordance with the adjusted motion curve.

13. The motion controller as claimed in claim 9, wherein the motion controller simultaneously controls a motion of at least one of (i) the at least one first and (ii) the second servo press.

14. A non-transitory computer-readable medium encoded with a computer program which, when executed by a processor of program-controlled device, causes control of a motion of a conveyor system of a servo press installation including at least a first servo press and a second servo press which are operated at an optimum offset in accordance with a criterion, the conveyor system comprising at least one conveyor apparatus for movement of a product which is to be processed by the servo press installation, and motion of the at least one conveyor apparatus being controlled by a motion controller of the conveyor system in accordance with the optimum offset, the computer program comprising:
- program code for determining a motion curve of the conveyor system including a first margin when the conveyor system is within a workspace of the first servo press, a second margin when the conveyor system is within a workspace of the second servo press, and a segment between the first and second margins which is entirely outside respective pressing workspaces of the at least one first servo press and the second servo press;
- program code for defining a time interval for motion within said segment based on the criterion;
- program code for adjusting the motion curve for motion of the product within the segment such that the motion curve in the first and second margins is unchanged, with reference to the defined time interval; and
- program code for controlling the conveyor system in accordance with the adjusted motion curve.

\* \* \* \* \*